US008184231B2

(12) United States Patent
Lee et al.

(10) Patent No.: US 8,184,231 B2
(45) Date of Patent: May 22, 2012

(54) DISPLAY DEVICE HAVING A REGULAR REFLECTION PART AND A DIFFUSED REFLECTION PART ON A FRONT PANEL

(75) Inventors: Moon-Hee Lee, Daegu (KR); Jong-Man Park, Goomi-si (KR)

(73) Assignee: LG Electronics Inc., Seoul (KR)

( * ) Notice: Subject to any disclaimer, the term of this patent is extended or adjusted under 35 U.S.C. 154(b) by 473 days.

(21) Appl. No.: 12/441,614

(22) PCT Filed: Sep. 5, 2007

(86) PCT No.: PCT/KR2007/004282
§ 371 (c)(1),
(2), (4) Date: Mar. 17, 2009

(87) PCT Pub. No.: WO2008/035869
PCT Pub. Date: Mar. 27, 2008

(65) Prior Publication Data
US 2010/0085643 A1  Apr. 8, 2010

(30) Foreign Application Priority Data

Sep. 18, 2006 (KR) .................. 10-2006-0089945

(51) Int. Cl.
*G02F 1/1333* (2006.01)
(52) U.S. Cl. .................................... 349/58; 362/600
(58) Field of Classification Search .............. 349/58–69; 359/456; 264/158; 428/338; 362/29; 361/679.2, 361/683
See application file for complete search history.

(56) References Cited

U.S. PATENT DOCUMENTS

| 4,491,616 | A | | 1/1985 | Schmidle et al. | 428/158 |
| 5,272,601 | A | * | 12/1993 | McKillip | 362/27 |
| 5,916,450 | A | * | 6/1999 | Muggli et al. | 216/4 |
| 6,038,070 | A | * | 3/2000 | Hori | 359/456 |
| 6,077,472 | A | | 6/2000 | Kataoka et al. | 264/338 |
| 6,301,102 | B1 | * | 10/2001 | Ybarra | 361/679.22 |
| 7,101,055 | B2 | * | 9/2006 | Hsieh et al. | 362/29 |
| 2005/0024552 | A1 | | 2/2005 | Tsuo et al. | 349/58 |

(Continued)

FOREIGN PATENT DOCUMENTS

CN  2810063 Y  8/2006

(Continued)

OTHER PUBLICATIONS

Chinese Office Action dated May 12, 2010 issued in Application No. 200780034614.X.

(Continued)

*Primary Examiner* — Akm Ullah
(74) *Attorney, Agent, or Firm* — KED & Associates, LLP

(57) ABSTRACT

Disclosed related to a display device according to the present invention comprising an external housing; a display module accepted into the external housing; and an image signal processing unit supplying image signals to the display module, and the external housing including a regular reflection unit regularly reflecting lights from outside and a diffused reflection unit diffusely reflecting lights from outside. It is advantageous that the normal watching of the screen while the watching of the display device is not disturbed, and that the satisfactory of the users is improved with a predetermined pattern when the display device is not being used. Further, it is also advantageous that the area of gloss may be controlled as controlling the relative area of the regular reflection unit and the diffused reflection unit.

8 Claims, 3 Drawing Sheets

U.S. PATENT DOCUMENTS

2005/0133962 A1    6/2005  Mumme
2005/0191470 A1    9/2005  Roys et al.
2009/0179910 A1*   7/2009  Inoue et al. .................. 345/581

FOREIGN PATENT DOCUMENTS

| JP | 09-239739   | 9/1997 |
| JP | 2005-096078 | 4/2005 |
| JP | 2005-103794 | 4/2005 |

OTHER PUBLICATIONS

International Search Report dated Dec. 13, 2007.
Dietert A.; "Das Gefühl Kauft Mit"; Kunststoffe, Carl Hanser Verlag, Munchen, Germany, vol. 10, Oct. 2004, pp. 214-215 (XP-001205067).
Glanzeffekte M; "Matte Glanzeffekte Einstellen"; Plastverarbeiter, Heuthig, GMBH, Heidelberg, Germany; vol. 56, No. 2, Feb. 2005; p. 51 (XP-001206047).
European Search Report dated Aug. 4, 2009.

* cited by examiner

[Fig. 1]
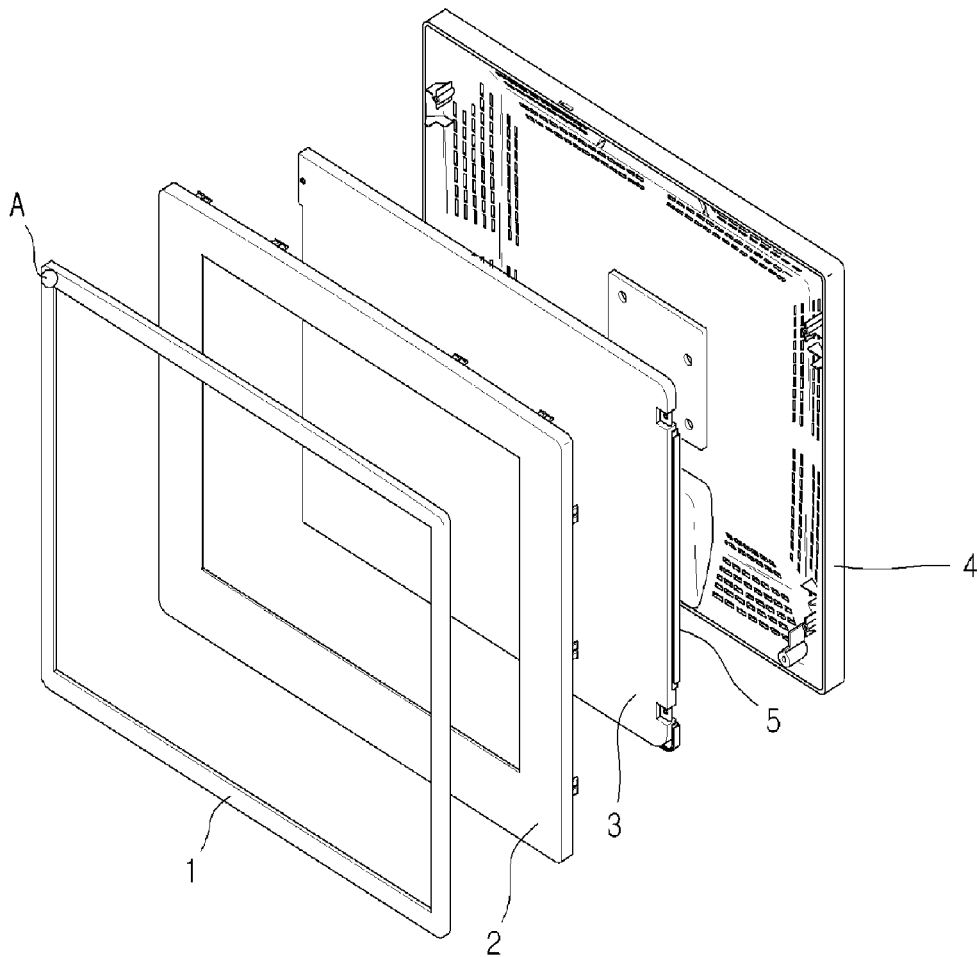
[Fig. 2]
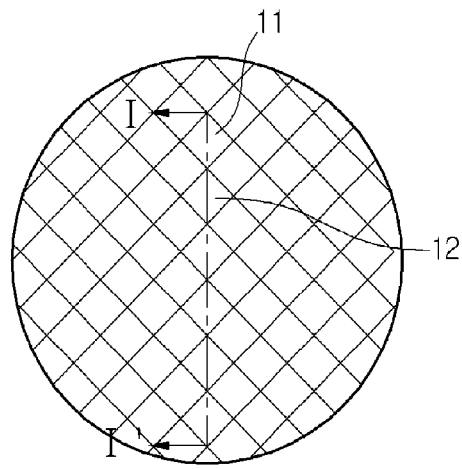

[Fig. 3]
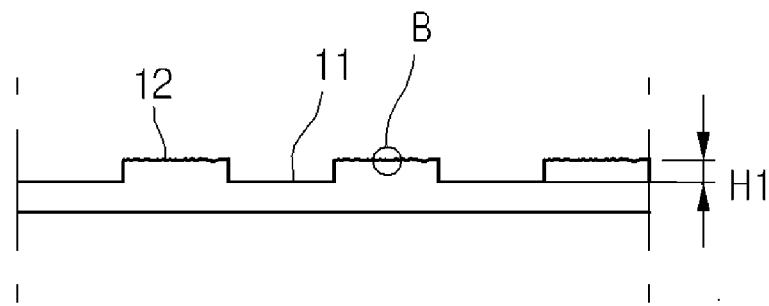
[Fig. 4]
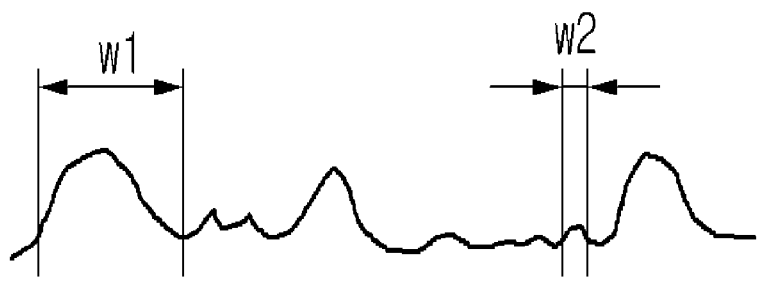
[Fig. 5]
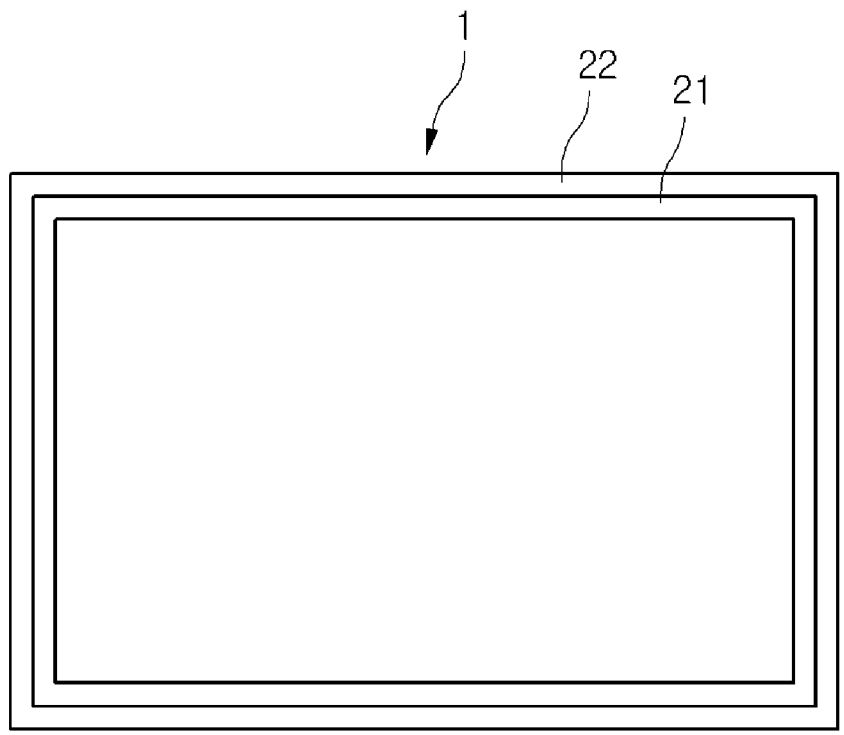

[Fig. 6]
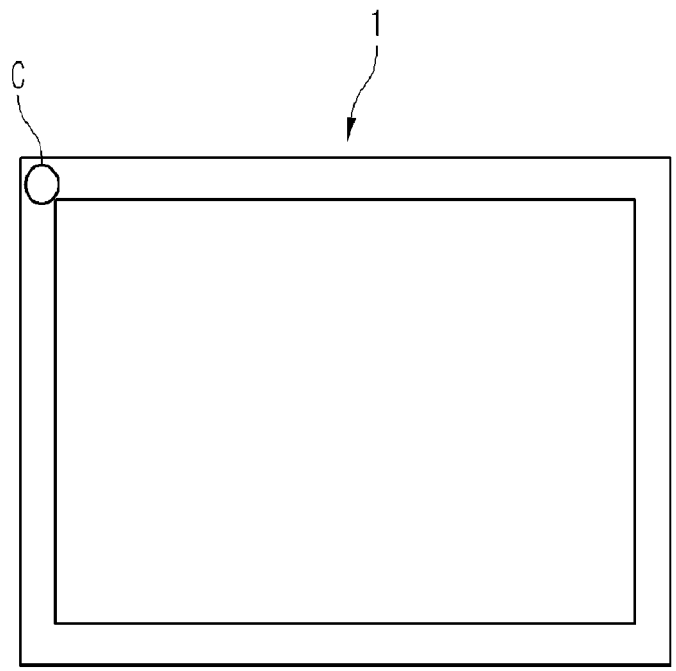
[Fig. 7]
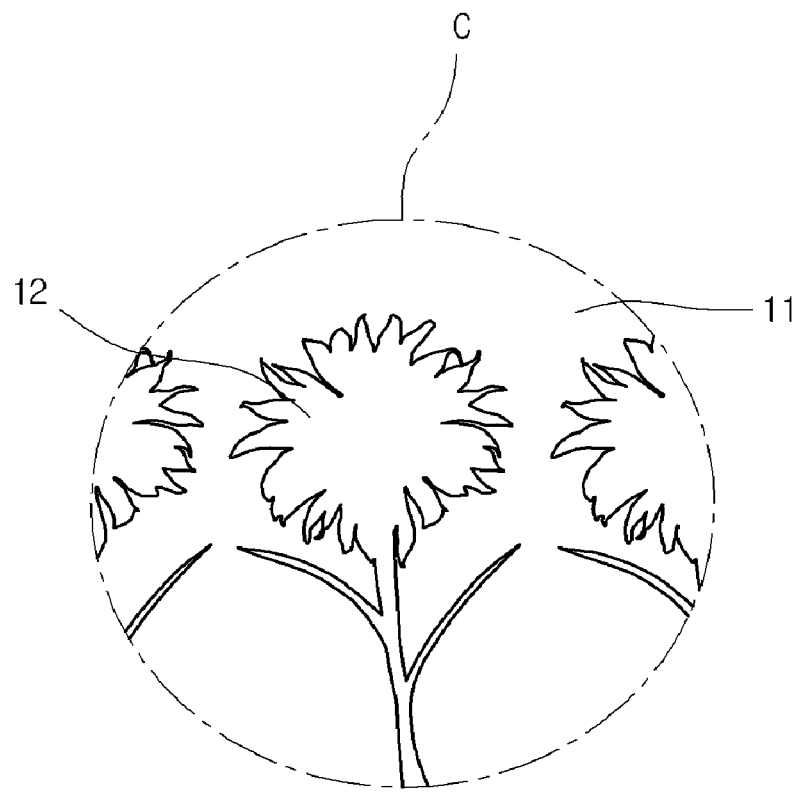

DISPLAY DEVICE HAVING A REGULAR REFLECTION PART AND A DIFFUSED REFLECTION PART ON A FRONT PANEL

TECHNICAL FIELD

The present invention relates to a molded material and, more particularly, to a molded material and a display device manufactured by using the molded material improving the visual image of the display device without obstructing the field of vision of users.

BACKGROUND ART

Various kinds of molded materials are provided at each of the external parts of the display devices that may be embodied as the front of the display devices to protect the components such as display modules and so forth arranged within the display devices. Lately, products stimulating the consumer's minds as embodying excellent gloss on the front of the display device (which is referred to as a glossing) and improving the external appearance of the products more beautiful are being provided.

The above-mentioned glossing helps the reconsideration of the image of products to be improved when the display devices are displayed in the stores, however, it can be a disadvantage leading to the loss of the image of the products, since the parts covered with dust or scratched becomes prominent when the display device is covered with dust or is scratched when it is used in homes. Moreover, the light of the electronic bulbs reflected from the products are not shined to consumers directly in the stores the reflected light from the front panel are not shined toward the eyes of people in the stores, but towards the floors of the stores, as the ceilings of the stores are usually high, and does not obstruct the fields of vision of users. However, the light obstructs the fields of vision of users as it is reflected to the users directly when the products are installed in homes, as indoors have low ceilings. It is further because the display devices are usually installed on the walls of middle height of eyes of viewers and the electronic bulbs on the ceilings.

Due to the above-mentioned disadvantage, the method capable of controlling the glossing molded materials conveniently as well as ensuring the image of high-class with gloss to the users and the related equipments are required. Further, it is required that the fields of vision of viewers are not obstructed by the gloss of the display device installed in general homes.

Furthermore, it may be advantageous that the atmosphere of indoors is improved better when the display device displays predetermined images when the users see, but without using the display device, as it is general that display devices are arranged at the places catching the sights of viewers well. The display device is a device that viewers get pleasant from watching images, however, the comfortable watching of users may be disturbed as the field of the visions of viewers are confused by the colored images when there are separate colored images on the outer frame of the images (the front panel) that is displayed on the display module. Therefore, in general, patterns formed with color, chroma and the difference of brightness are not applicable to the front panel close to the screen unit of the display device.

DISCLOSURE OF INVENTION

Technical Problem

The present invention is conducted to overcome the above-mentioned problems, and an object of the present invention is to provide a molded material and a display device manufactured by using the molded material capable of remedying the inconveniences of users by the glossing.

Further, another object of the present invention is to provide a molded material and a display device manufactured by using the molded material preventing the obstacles of view of the general viewers watching the screen and capable of improving the indoor atmosphere better as the predetermined patterns are appeared when the display device is not being used.

Technical Solution

The display device according to the present invention comprises an external housing of a display device; a display module arranged in the external housing; and an image signal processing unit that supplies image signals to the display module, and the external housing includes a regular reflection unit regularly reflecting light from outside and a diffused reflection unit reflecting light from outside diffusely.

The display device according to another aspect of the present invention comprises an external housing of a display device; a display module arranged in the external housing; and an image signal processing unit that supplies image signals to the display module, and a glossing contrast part composed of a regular reflection unit and a diffused reflection unit is provided at the external housing.

The display device according to another aspect of the present invention comprises an external housing of a display device; a display module arranged in the external housing; and an image signal processing unit that supplies image signals to the display module, and the external housing includes a pattern unit that predetermined patterns are formed; and a non-pattern unit that patterns are not formed.

The molded material of the quality of resin according to another aspect of the present invention comprises a regular reflection unit that light is reflected regularly is formed at the outer surface of the molded material; and a diffused reflection unit divided from the regular reflection unit and that light is reflected diffusely as different with the regular reflection unit.

The molded material of the quality of resin according to another aspect of the present invention includes a glossing contrast unit composed of a regular reflection unit forming the regular reflected light and a diffused reflection unit forming diffused reflected light that are formed at the external surface of the molded material.

The molded material of the quality of resin according to another aspect of the present invention includes a pattern unit that predetermined patterns are formed; and a non-pattern unit that predetermined patters are not formed that are formed at the external surface.

Advantageous Effects

The present invention is advantageous in that it is easy to control the glossing for the molded material used for the display device, and in that the inconvenience of users toward the glossing is improved. Further, users can watch the screen normally without any disturbs while watching the display device, and the indoor atmosphere is improved better with the predetermined patterns when the display device is not being used. Furthermore, the tastes of users can be satisfied when the patterns are optionally designed as what users want, and the image of the products can become high-graded.

BRIEF DESCRIPTION OF THE DRAWINGS

FIG. 1 is a disassembled perspective view of a display device according to the present invention, FIG. 2 is a magnified view of the part "A" in FIG. 1, FIG. 3 is a cross-sectional view cut along the I-I' in FIG. 2, FIG. 4 is a magnified view of the part "B" in FIG. 3, and is illustrating the waveform of cross-section of a diffused reflection unit, FIG. 5 is a front view of a front panel according to another preferred embodiment of the present invention, FIG. 6 is a front view of a front panel according to another preferred embodiment of the present invention, FIG. 7 is a magnified view of the part "C" in FIG. 6.

MODE FOR THE INVENTION

Reference will now be made in detail as for the preferred embodiment of the present invention with reference to the accompanying drawings.

FIG. 1 is a disassembled perspective view of a display device according to the present invention, Referring to FIG. 1, the display device according to the present invention comprises a display module 3 displaying picture, a front cover and a back cover protecting each of the front and the rear of the display module 3, a front panel 1 that can be observed by the eyes of users directly and clearly as further formed on the front of the front cover 2.

Here, the front cover 2 and the front panel 1 of the back cover 4 are components accepted into the display module 3, and may be called as external housing, since they are components covering the display module 3 as forming the external appearance of the display device at the same time and they can are shown to outside. As a matter of course, the kinds of the components forming the external housing is not limited to the above, but it is possible that various kinds of components may be provided in accordance with the formation and the kinds of the detailed components or that the component may be changed variously, for instance, a separate front panel 1 is removed, but combined with the front cover 2.

Further, an image signal control unit 5 providing the images that are displayed on the display module 3 is provided in the display module 3. It is obvious that the image signal control unit 5 is a type of various substrates that a multitude of electronic components is loaded.

The major object of the present invention is on improving the front panel 1 that is shown to users obviously, however, it is sure that the idea of the present invention is applicable for any molded materials that can be shown to outside of the display device such as a front cover and a back cover. Only, it is obvious for the idea of the present invention to be mainly applicable to the front panel 1 that is generally shown to users.

The present invention provides each of the regular reflection units reflecting light to the external appearance unit of the front panel 1 in the same angle to the incidence angle and the diffused reflection units reflecting light in the various angles different from the incidence angle. Furthermore, the convenience of the users can be improved as the diffused reflection unit and the regular reflection unit provide a predetermined pattern as each of their areas is separated.

As giving a detail to this, the regular reflection unit is a part glossing, and as the dusted parts or scratched parts of the regular reflection unit are not shown clearly because of the diffused reflection unit even though the regular reflection unit is dusted or scratched, therefore, the dusted parts and the scratched parts seem not to be exist in actuality. Furthermore, it is advantageous that scratches, dust and etc do not attract the attention of users because of the predetermined patterns provided with the regular reflection unit and the diffused reflection unit connected to each other. On one hand, the diffused reflection unit is basically a part that light is reflected diffusely, therefore, the scratched parts and the dusted parts are not shown easily.

Further, it is advantageous that the fatigue of the eyes of viewers is reduced and the interruption to the field of the vision by electric lights is reduced, since the light from the electric light on the ceiling does not have effects on the eyes of the viewers as the light is reflected regularly.

Furthermore, in case that the pattern formed with the regular reflection unit and the diffused reflection unit is provided, users can watch the screen comfortably as the confusion of the field of the vision of the users is prevented, since it is hard to see the patterns with the users eyes. In this case, it can be clearly understood when it is compared with the case that the fields of the vision of the users are interrupted by the confusing colored pattern on the front panel 1.

FIG. 2 is a magnified view of the part "A" in FIG. 1, and FIG. 3 is a cross-sectional view cut along the I-I' in FIG. 2.

Referring to FIGS. 2 to 3, each of a regular reflection unit 11 and a diffused reflection unit are formed as forming a predetermined pattern on the front of the front panel 1, and the regular reflection unit 11 and the diffused reflection unit 12 are formed in the shape of diamonds. As a matter of course, the pattern provided by the regular reflection unit 11 and the diffused reflection unit 12 is not limited to the formation illustrated in the accompanying drawings, but is possible to be provided in any shapes. It is sure that the glossing of the front panel 1 as a whole may be controlled by the regular repetition of the minute pattern. In this case, users can control the grade of gloss as much as they want conveniently without any difficulties in selecting any method for controlling the grade of gloss they want.

Controlling the grade of glossing with the regular reflection unit and the diffused reflection unit may be called as contrast glossing, and the surface that the glossing is controlled by the regular reflection unit and the diffused reflection unit may be called as a contrast glossy surface. More particularly, it becomes glosser when the assigned area of the regular reflection unit is bigger, and it becomes less glosser when the assigned area of the diffused reflection unit is bigger. There are methods for controlling the contrast gloss such as a method forming more regular reflection unit (shape of diamonds in FIG. 2) and forming less diffused reflection unit (shape of diamonds in FIG. 2) to increase the gloss, and the opposite method is also possible. The opposite method is designing the form of the regular reflection unit bigger and designing the form of the diffused reflection unit smaller. There are various other methods, however, it is good, because the fatigue of the eyes of users is reduced, since proper glossing is obtained as controlling the gloss in accordance with the areas of the diffused reflection unit and the regular reflection unit. Further, a predetermined pattern may be provided as offering the union of the regular reflection units and the union of the diffused reflection units. For example, a fixed pattern can be expressed as controlling the size and the position of the diffused reflection unit and the regular reflection unit as in the similar method controlling the sizes of dots to be smaller or bigger to express the shapes of the black-and-white printed matters. In this case, it is advantageous that the sense of beauty of the display device can be increased without disturbing the perspective vision of users.

On one hand, the diffused reflection unit 12 is provided as protruded with a predetermined height as compared to the regular reflection unit 11, and the surface of the diffused reflection unit 12 is formed in a shape of a predetermined bumpy wave. The diffused reflection unit 12 is formed as protruded for a fixed length H1 upwardly as compared to the regular reflection unit 11. It is because the front panel 1 is manufactured as molded, and the state of the protrusion can be different when the regular reflection unit 11 and the diffused reflection unit are provided through another method.

It is distinctive that the regular reflection unit and the diffused reflection unit are formed at a time in the molded material of the present invention. That is, the light from the regular reflection unit 11 is illuminated in the same angle to the incident angle as reflected in the same angle to the incident angle, and because of this character, users can see the images of the corresponding place which are concretely observed by the regular reflection unit 11. Merely, not the images as minor but winding images can be observed in accordance with the evenness of the front panel 1, however, it is obvious that the gloss is observed. On the other hand, users can't see the images on the corresponding places which can be observed by users, since the illuminated angle is different as the incident light is reflected in the angle different from the incident angle, the various reflected angle even though the light incidents in the same direction. Therefore, glossless is natural. The glossless part is shown as dull upon the whole.

The diffused reflection unit 12 is a little rough, that is, the surface is formed in a predetermined pattern composed of hollows and ridges of waveforms different from each other. Further, to be functioned as a diffused reflection unit 12, big waveforms are formed at least smaller than 100 micro meter, and this is because users can be unsatisfied as they can see the inner pattern of the diffused reflection unit with their eyes when the waveform is bigger than 100 micro meter. The smallest waveform may be more than 1 micrometer due to the matter of manufacturing method. However, the waveform may be formed in a various formation in accordance with the manufacturing method or with the quality of the molded material, as it is not limited to the above-mentioned detailed numerical value, and further, the images reflected to the diffused unit 12 are seen dull upon the whole.

Furthermore, there could be a height difference H1 between the diffused reflection unit 12 and the regular reflection unit 11. It is proper for the difference of the height to be provided within the scope of 1 to 100 micrometer, however, it is variable as it is influenced by the manufacturing method of the diffused reflection unit and the regular reflection unit. Merely, it is not proper for the heights to be in great difference, since the own formation of the waveform can be formed by the leap due to the height difference, and since the waveform would be seen to the eyes of users. When the heights are in low difference, it is apprehended that the pattern in the diffused reflection unit is not formed properly. The cross-section of the waveform of the diffused reflection unit is illustrated in detail in FIG. 4.

On the other hand, in a method of defining the diffused reflection unit 12 and the regular reflection unit 11 with using the grade of roughness, the diffused reflection unit 12 means that the reflected light is not even upon the whole as it is in a high roughness, and the regular reflection unit 11 means that user can see the images with their eye by the light reflected regularly, as the reflected light is even upon the whole as it is in a low roughness.

According to the display device and the molded material of the display device described above, it is advantageous that the appreciation of aesthetic of users and the convenience for users are improved by the regular reflection unit (glossing unit) including a part that reflected images are seen to the eyes of users. Otherwise, it is advantageous that the convenience for users is improved, as the reflection of the light in a predetermined part is isolated by the diffused reflection unit (the non-glossing unit).

Furthermore, it is advantageous that the appreciation of aesthetic of users is further improved through the pattern formed by the regular reflection unit and the diffused reflection unit getting joined together, and the satisfaction of users is further improved when the pattern is designed by the order designing method. With this, users can enjoy their own patterns at the state that the field of vision is not disturbed with the screen that can be felt when the pattern is provided with color, brightness and chroma. That is, the satisfaction of the users is further improved, the image of high grade of the product is improved, and the disturb to the picture is reduced by the patterns, as users cannot feel the pattern when they enjoy only the images displayed on the display device itself without attention, and as users can see the pattern when they observe the pattern with attention.

The diffused reflection unit and the regular reflection unit may be manufactured by various methods. For example, it is possible to form the pattern as engraving the diffused reflection unit and the regular reflection unit on the mold at the molding process for the mass production. This method is proper for the mass production, however, is difficult to deal actively with the own patterns ordered by users.

As another method, there is a method processing the surface of the front panel after manufacturing the complete front panel. This method is not proper for the mass production, but is a method capable of dealing with the own patterns ordered by users actively, since it is possible to manufacture the patterns ordered by users. There are manufacturing methods for the latter manufacturing method such as processing the corresponding surface with the various surface processing method such as Chemical mechanical processing method, spurting method, etching method and CVD method after manufacturing whole of the outer surface of the front panel as a diffused reflection unit or regular reflection unit, and therefore, manufactures can control the reflection unit with the method they want.

Even though the detailed description for each of the methods is not enough, it is easily supposed that the manufacturing methods are applied differently in accordance with the detailed formations such as the kinds of the texture, the form of desired patterns and so forth.

As another method, a method forming a regular reflection unit or a diffused reflection unit as painting glossing paint or non-glossing paint after manufacturing the whole outer surface of the front panel as a diffused reflection unit or a regular reflection unit.

The above-mentioned method has some disadvantages in the aspect of mass production as already described above as a separate manufacturing method. However, the usage is expected in the aspect of manufacturing patterns that users want as satisfying the viewers.

FIG. 5 is a front view of a front panel according to another preferred embodiment of the present invention.

Referring to FIG. 5, according to another aspect of the present invention, a pattern unit 21 that regular reflection unit 11 and the diffused reflection unit 12 are formed in a fixed formation is formed on the inside of the squared frame of the front panel 1, and a non-patterned unit 22 that only one reflection unit is provided on the outer part of the pattern unit 21 without dividing if it is a regular reflection unit 11 or a diffused reflection unit 12.

The pattern unit 21 and the non-pattern unit 22 may not only forming the relation of inner and outer units, but may be provided in a various other arrangement.

FIG. 6 is a front view of a front panel according to another preferred embodiment of the present invention, and FIG. 7 is a magnified view of the part "C" in FIG. 6.

Referring to FIGS. 6 and 7, the diffused reflection unit 12 is provided as a form of continued flowers and the regular reflection unit 11 is provided on the background of the flower pattern on the front panel 1. Here, the pattern unit that flower pattern is provided may be called as a diffused reflection unit 12, and regular reflection unit 11 which is the background may be called as a non-pattern unit. The opposite case that the flower pattern is provided on the regular reflection unit 11 and the background is provided on the diffused reflection unit 12 is possible.

Approaching to the idea of the present invention overcoming the present preferred embodiment, the pattern unit can have meanings as an aggregate having patterns (preferred embodiments related to FIG. 5) and as a part recognized that the pattern is divided through a regular reflection unit or a diffused reflection unit (FIGS. 6 and 7) at the same time. It depends on the difference whether the size of the pattern is big or small. It is because, for example, consumers would recognize the pattern as a part that the small patterns are crowed as an aggregate when the size of the pattern is in a very small size, and consumers would recognize the one pattern as a pattern unit when the pattern is in a great size.

According to another preferred embodiment of the present invention, it is advantageous that the contrast gloss can be controlled in accordance with the distance between the patterns, sizes of the patterns and the arrangement of the patterns, and further, the sense of beauty is improved with the patterns.

Other preferred embodiments included in the same idea to the present invention can be provided in the present invention, and reference will now be made in detail as for the preferred embodiment of the present invention.

First, it is described that the molded material having each of regular reflection units and diffused reflection units used only for the front panel 1 adjacent to the screen of the display device in the present invention. However, the idea of the present invention is not limited to this, and the same molded material is also applicable for the hidden front cover or back cover, even though they are different from the front panel that the visual effect is prominent, and therefore, the sense of the beauty of the users can be further satisfied. Merely, it is a matter of course that the effect of the present invention is further improved as it is applied to the front panel that the visual effect of the users is the greatest.

Further, it is described that the glossing, the grade of gloss (contrast gloss) is controlled by the repetition of the patterns, as giving patterns in a small formation illustrated In FIG. 2 is formed in the formation of patterns repeatedly as an example in the preferred embodiment of the present invention, however, the it is not limited to this, but it is also possible that the pattern can be manufactured as one pattern that a big pattern is not repeated, and having a great effect on the visual angle of the users, and further, it is included in the idea of the present invention.

Further, it is described that the regular reflection unit is protruded upwardly as compared to the diffused reflection unit, however, it is not limited to this, but may be variable in accordance with the manufacturing methods.

Furthermore, it is presented that the molded material provided in the present invention is applied to the front panel, however, it is not limited to this, but it can improve the convenience of the users as applied to various products which have the sense of glittering due to the glossing, but which also can dissolute the fatigue of the eyes of users due to the glittering upon the whole. For example, it is applicable for other products such as stands, bases and so forth as the outer surface of monitors.

Moreover, it is described that the regular reflection unit and the diffused reflection unit are mixed in the preferred embodiment of the present invention, such as the two parts which is different from each other (regular reflection and diffused reflection) forms the boundary of each other. However, it is not limited to this, but it is also possible that patterns are formed in various formations as the regular reflection and the diffused reflection are mixed with each other.

However, it is a matter of course that it is a distinctive feature of the present invention that the gloss of the molded material may be controlled by the predetermined pattern with the difference of the grade of reflection on each part and that users can be satisfied with this.

INDUSTRIAL APPLICABILITY

The present invention is advantageous in that it is easy to control the gloss of the molded material, especially to the molded material used for the display device of the present invention, and that the convenience of the viewers against the gloss is improved.

Further, it is advantageous that the normal watching of the screen while the watching of the display device is not disturbed, and that the satisfactory of the users is improved with a predetermined pattern when the display device is not being used. Furthermore, the tastes of users are further satisfied and the high-graded image of the product is improved when the pattern is manufactured as the patterns what users want.

It is also advantageous that the area of gloss may be controlled as controlling the relative area of the regular reflection unit and the diffused reflection unit. Further, it is advantageous that the gloss what users want is conveniently obtained as the gloss of the molded material is controlled upon the whole when the pattern of the regular reflection unit and the diffused reflection unit is provided minutely.

Moreover, it is advantageous that the inconvenience of usage for the users of the display device feeling from the glittering gloss in homes.

The invention claimed is:

1. A display device comprising;
a display module to output a picture;
a front panel placed in front of the display module to cover at least one front edge of the display module; and
a back cover to protect a rear of the display module,
wherein a front surface of the front panel includes:
a regular reflection part to regularly reflect lights from outside; and
a diffused reflection part to diffusely reflect lights from outside,
wherein the regular reflection part and the diffused reflection part are directly processed on the front surface of the front panel, and the regular reflection part and the diffused reflection part are mixed on the front surface of the front panel to form a predetermined form of a pattern.

2. The display device according to claim 1, wherein the pattern in the predetermined form is repeatedly formed on the regular reflection part and the diffused reflection part.

3. The display device according to claim 1, wherein a roughness of the regular reflection part is different than a roughness of the diffused reflection part.

4. The display device according to claim 1, wherein there is a height difference of 1 to 100 micrometer between the regular reflection part and the diffused reflection part.

5. A display device comprising:

a display module to display a picture;

a front panel in front of the display module to cover a front edge of the display module, wherein a regular reflection part and a diffused reflection part are provided in a predetermined pattern form directly on a front surface of the front panel; and a back cover to cover a rear of the display module, wherein the regular reflection part on the front surface to regularly reflect light from outside the display device, and the diffused reflection part on the front surface to diffusely reflect light from outside the display device in a different manner than the regularly reflected light.

6. The display device according to claim 5, wherein the predetermined pattern form is repeatedly formed on the front surface of the front panel by the regular reflection part and the diffused reflection part.

7. The display device according to claim 5, wherein a roughness of the regular reflection part is different than a roughness of the diffused reflection part.

8. The display device according to claim 5, wherein the regular reflection part has a first height and the diffused reflection part has a second height, and a difference between the first height and the second height is 1 to 100 micrometers.

* * * * *